United States Patent [19]
Borg et al.

[11] 3,808,438
[45] Apr. 30, 1974

[54] METHOD FOR THE DETECTION OF MATERIAL DEFECTS OF A PRODUCT BY MEANS OF PICK-UP OF HEAT RADIATION EMITTED FROM THE PRODUCT

[75] Inventors: Sven-Bertil Borg; Claes Thomas Ohman, both of Taby, Sweden

[73] Assignee: ASA Aktiebolag, Lidingo, Sweden

[22] Filed: Mar. 12, 1973

[21] Appl. No.: 340,335

[30] Foreign Application Priority Data
Mar. 14, 1972   Sweden............................... 3205/72

[52] U.S. Cl............................... 250/340, 250/341
[51] Int. Cl............................................... G01t 1/16
[58] Field of Search ........... 250/340, 341, 342, 343, 250/352, 353, 354, 219 DF

[56] References Cited
UNITED STATES PATENTS
2,606,294   8/1952   Hagan................................ 250/341
3,652,863   3/1972   Gaskell et al................. 250/219 DF Primary Examiner—James W. Lawrence
Assistant Examiner—Davis L. Willis

[57] ABSTRACT

A system is disclosed for the detection of defects in a product. The system includes an infrared scanner and a screen device having an emission factor of $\epsilon\lambda$. The line scanner includes a detector which provides a signal used for controlling the temperature of the screen device and a reference signal for comparing a portion of the detected signal to provide a defect signal.

9 Claims, 4 Drawing Figures

PATENTED APR 30 1974          3,808,438
SHEET 1 OF 2
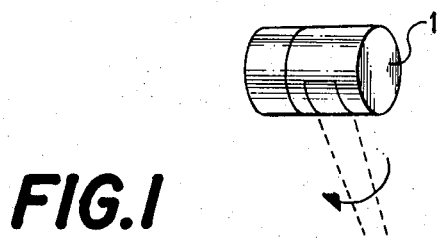
FIG.1
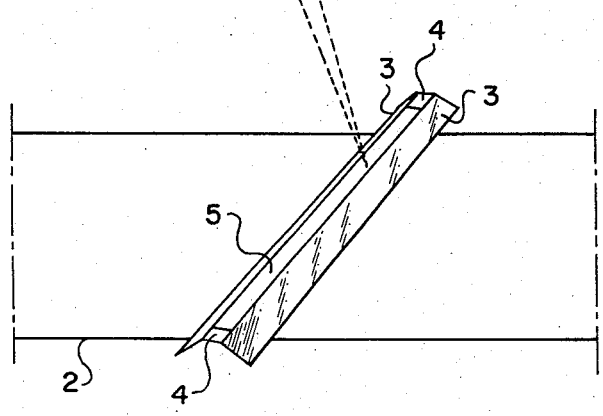
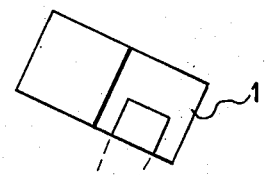
FIG.2
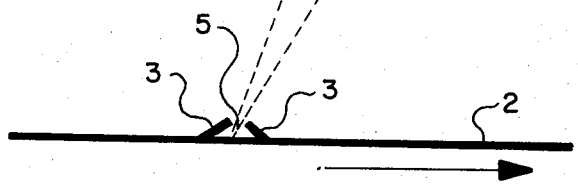

METHOD FOR THE DETECTION OF MATERIAL DEFECTS OF A PRODUCT BY MEANS OF PICK-UP OF HEAT RADIATION EMITTED FROM THE PRODUCT

CONVENTION PRIORITY

This is a convention application based upon Swedish Pat. application No. 3205/72, filed on Mar. 14, 1972 by AGA AKTIEBOLAG.

FIELD OF THE INVENTION

The present invention relates to a method for the detection of material defects, such as inclusions of foreign matter, cavities or laminations in a product by means of pick-up of the heat radiation emitted from the product with a detector (infrared) device.

BACKGROUND OF THE INVENTION

It is known that material defects of the aforementioned type can be detected in for example rolled or extruded products. In practice the product is uniformly heated on one side and the distribution of temperature on the other is measured by scanning it with an infrared detector. Inhomogenities of the material affect the local passage of heat and consequently the temperature on the measuring side. Thus, disturbances in the heat diagram are observed where inhomogenities are present and hence it becomes possible to locate the same.

This method operates well as a rule if it is possible to achieve uniform heating and if the emission factor on the measuring surface is constant over the surface. If this factor varies variations in the radiation are caused, which usually cannot be distinguished from the variations in radiation produced by changing temperatures.

BRIEF DESCRIPTION OF THE INVENTION

In accordance with the present invention, the inconveniences of the prior art are eliminated by employing a screen device which has an emission factor close to one and in which the temperature of the screen device is controlled to be substantially equal to the temperature of the product under test.

DETAILED DESCRIPTION OF THE INVENTION

The emission of the surface per unit of the surface within the wavelength interval $\lambda$ to $\lambda + d\lambda$ expressed in photon radiation is $\epsilon_\lambda \cdot N_\lambda \cdot d\lambda$ where according to Planck's law $$N_\lambda = 2\pi c \cdot \lambda^{-4} (e^{(c \cdot h/k \cdot \lambda \cdot T)} - 1)^{-1} \quad (1)$$

here $c$, $h$ and $k$ are constants and we can write therefore $$N_\lambda = f(\lambda \cdot T) \quad (2)$$

The radiation received by the measuring system also includes diffusely reflected radiation from the environment. If the environment has a homogeneously distributed temperature $T_a$ it is possible then to consider the environment as a black body, that is to say its emission factor $\epsilon_a = 1$. The radiation of the environment can then be written $$N_{a\lambda}' = f(\lambda, T_a) \quad (3)$$

The reflection factor of the surface is $\rho\lambda = 1 - \epsilon\lambda$ when the transmission = 0.

The total radiation received by the measuring system within the band $\lambda$ to $\lambda + d\lambda$ can be written generally as $$dR_\lambda = C_\lambda [\epsilon_\lambda \cdot N_\lambda + (1 - \epsilon_\lambda) \cdot N_{a\lambda}] d\lambda \quad (4)$$

where $C_\lambda$ is a system constant representing optical light intensity, spectral transmission etc.

The object temperature at an arbitrary point may be described by $$T = T_o + \Delta T \quad (5)$$

where $T_o$ = mean temperature of object.
$\Delta T$ = deviation from mean temperature.
Hence $$N_\lambda = N_{o\lambda}(\lambda \cdot T_o) + \Delta N_\lambda + N_{o\lambda} + \partial N_\lambda /\partial T \cdot \Delta T \quad (6)$$

where $N_{o\lambda}$ photon radiation at wavelength and mean temperature $T_o$.

$\alpha N_\lambda /\alpha T$ partial differential quotient of the photon radiation with respect to the temperature at wavelength $\lambda$.

From this follows that $$dR_\lambda = C_\lambda [\epsilon_\lambda \cdot N_{o\lambda} + \epsilon_\lambda \cdot \partial N_\lambda /\partial T \cdot \Delta T + N_{a\lambda} - \epsilon_\lambda \cdot N_{a\lambda}] d\lambda \quad (7)$$

If one now sets $T_o = T_a$ we get $N_{o\lambda} = N_{a\lambda}$ and the expression for $N_{a\lambda}$ is reduced to $$dR_\lambda = C_\lambda [\epsilon_\lambda \cdot \partial N_\lambda /\partial T \cdot \Delta T + N_{a\lambda}] d\lambda \quad (8)$$

which, thus, includes a term corresponding to the temperature deviation of the object from its mean value $T_o = T_a$ and an essential constant term $N_{a\lambda}$ deriving from the environmental radiation.

If $\Delta T = 0$ — corresponding to a defect-free product — we get $dR = dR = C_\lambda = N_{a\lambda} \cdot d\lambda$ constant and independent of $\epsilon_\lambda$.

On the other hand, if a surface appears on the scanned line with a temperature different $\Delta T$ from $T_o$ — this corresponds to a defect in the product — there will be a deflection in the output signal if not $\epsilon_\lambda$ is equal to 0 for this particular surface, which is extremely improbable.

The above calculations related to the radiation within an infinitesimal spectral band, but it is readily appreciated that integration over the whole wave range, within which the infrared system in question operates, gives the same result.

The method in accordance with the invention therefore aims at achieving two conditions, one of which is to arrange for $T_a$ to be substantially equal to $T_o$ and for the environment of temperature $T_a$ to be "black body" that is to say to have an emission factor near 1.

DESCRIPTION OF THE DRAWINGS

The method in accordance with the invention will be described in detail on the basis of the enclosed drawings, in which, FIGS. 1 and 2 show examples of embodiments of the method in accordance with the invention.

FIG. 1 shows equipment by which the method in accordance with the invention is practiced. Detection of the infrared radiation is done by scanning which takes place by means of a line scanner 1, which scans a product 2 across the direction of production. This direction of the production is marked in the figure by an arrow and thus indicates the direction in which the product, which in the example may be a continuous band, proceeds past the line scaner 1. Naturally it is not necessary for the product to have the form of a long band. It may consist of small units which are fed, for example, past the line scanner 1 or other detector device while resting on a conveyor belt.

Figure 3:
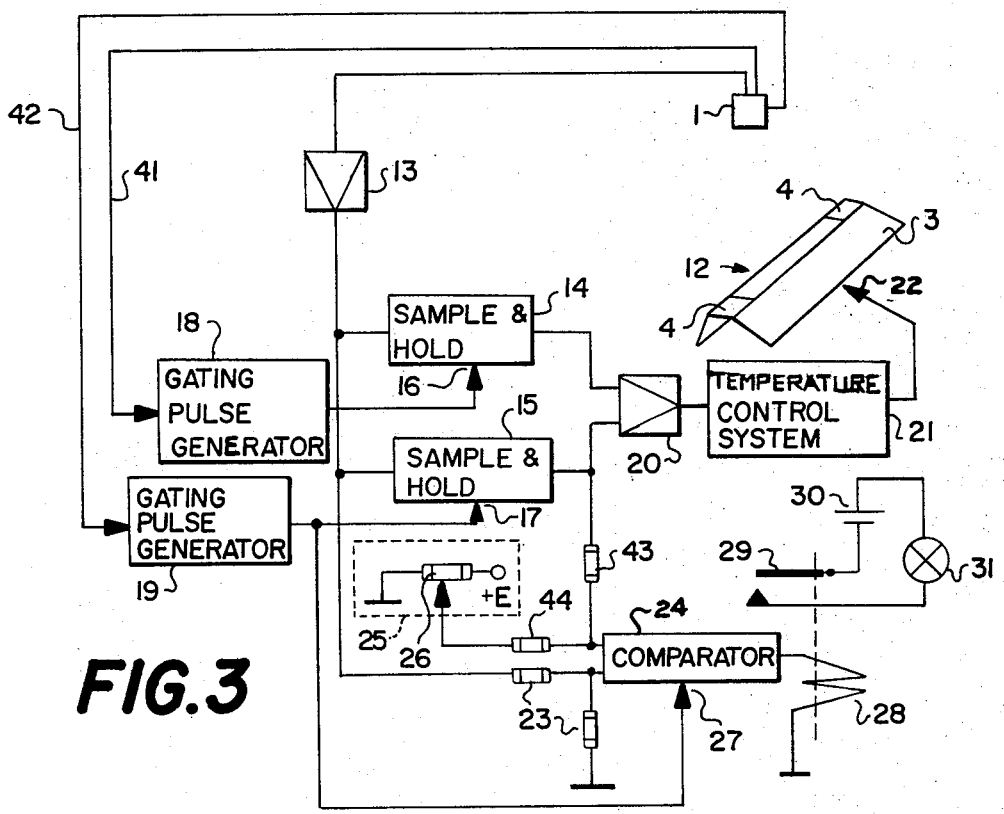
FIG. 3 shows a schematic diagram of a system for the realization of the method according to the invention.

Two metal bars 3 of good thermal conductivity are placed close to and parallel with the intersection between the planes of the product and of scanning in such a manner that the greater part of the reflections from the product surface towards the line scanner 1 derive from the bars 3, whose emission factor on the inside, by means of painting or other preparation, is made as closely equal to 1 as possible for the wave band in question. The bars 3 are provided with devices for adjusting the temperature to the same value as the temperature of the product. This device will be described in greater detail in connection with FIG. 3. Two metal bridges 4 connect the two bars to one another at their ends. These bridges, which have good thermal conductivity and high emission factors, assume the same temperature $T_a$ as the bars and are scanned by the line scanners at the beginning and end of the sweep. In doing this, information is obtained on the temperature of the bars which can then be adjusted so that it closely agrees with the mean temperature $T_o$ of the product. The two metal bars 3 and the bridges 4 together form a screen device.

In FIG. 1 the product plane and the scanning plane intersect at a right angle. The screen device prevents the bulk of the surrounding radiation, after reflection on the product surface, from reaching the detector of the line scanner 1. The metal bars 3 and the bridges 4 are so arranged that a slot-shaped opening 5 is formed in the screen device. This opening allows the heat radiation from the product to reach the line scanner 1. The surrounding radiation which penetrates down through this opening 5 and is reflected against the surface of the product 2 will be reflected through the opening and in so doing also reach the detector of the line scanner 1.

To prevent such surrounding radiation, having passed the opening and after reflection against the product 2, from again passing through the opening in the direction of the line scanner 1. The line scanner 1 is placed (see FIG. 2) in such a manner that an acute angle is formed between the plane of the product 2 and the plane of scanning.

The screen device in FIG. 2 differs from that in FIG. 1 inasmuch as the two metal bars 3 are different width among themselves. The narrower metal bar is placed inside the acute angle between the plane of the product and the scanning plane. The surrounding radiation which passes through the opening 5 and is reflected by the product 2 and again passes through the opening 5 will be reflected mainly in a plane perpendicular to the plane of the product and in so doing will not strike against the detector of the line scanner 1.

In FIG. 3 is shown in further detail an example of a device for the realization of the method in accordance with the invention. In accordance with what was stated earlier in connection with FIGS. 1 and 2 a screen device 12 is arranged above the product (not shown in FIG. 3), which is to be examined. The line scanner 1 having an infrared detector (IR detector) then scans the product as indicated above. The signal from the IR detector is amplified on a video amplifier 13, whereupon the amplified signal is fed to two sample-and-hold circuits 14 and 15, which form the mean value of the incoming signal. These circuits have a relatively long time constant and are read out by means of gating pulses on control inputs 16 and 17. These gating pulses are produced, as will be explained in detail in the following, by two gating pulse generators 18 and 19 connected to the timing controls of the line scanner 1 by leads 41 and 42 respectively.

The signals from the sample-and-hold-circuits 14 and 15 are passed to a differential amplifier 20 which in turn is connected to a conventional temperature control system 21 for the control of the temperature of the screen device 12, which is illustrated by means of arrow 22. The temperature control system 21 and the arrow 22 can be, for example, a single heating device for applying heat to the screen device 12.

The signal from the video amplifier 13 is also connected via a voltage divider 23 (formed from two resistors) to one input of a comparator 24. To the other input of this comparator 24 is connected both the output on the one sample-and-hold-circuit 15 through a resistor 43 and a variable voltage from a source 25 through a resistor 44.

The comparator 24 is provided with a control input 27 to which are passed gating pulses from the gating pulse generator 19 which also controls the sample-and-hold-circuit 15. As a result the comparator 24 is controlled so, that the signals on the two inputs are compared only when the control input 27 is activated.

The output of the comparator 24 is arranged to drive a coil 28 of a relay. The contact 29 of the relay is included in the example in a closed circuit comprising a voltage source 30 and a lamp 31.

The function of the layout in FIG. 3 will now be explained in detail with the help of the diagram in FIG. 4. The video signal from the video amplifier 13 has a typical appearance as shown by the curve 32 in FIG. 4. The curve 32 thus represents the variations of temperature detecting the line scanner 1 during a sweep. The curve 32 starts with the temperature of one of the bridges which is, thus, $T_a$ and then passes over on the temperature profile of the product and ends with the temperature of the other bridge which is also $T_a$. The mean value of the temperature of the product is designated $T_o$.

The two gating pulse generators 18 and 19 are controlled by the sweep system so that the gating pulse generator 18 generates a gating pulse which is high during the passage of the sweep over the bridges. The gating pulse generator 19, which among other things controls the comparator, produces a gating pulse which is high during the time the product is being scanned. This is illustrated by the curves 34 and 35 respectively in FIG. 4, which thus constitute the respective output signals of the gating pulse generators. As is apparent from FIG. 4, the pulses of the two gating pulse generators may not directly suceed one another, there being a certain time loss between them. By means of an accurate and well trimmed equipment this time loss can be eliminated, but in most applications this is not necessary. Irregularities, transients at the transition of the sweep between bridge and product and vice versa are eliminated in a simple manner by means of the time loss.

The sample-and-hold-circuits 14 and 15 are read-out when their respective control inputs 16 and 17 are activated, that is to say when the pulse is high on these inputs.

This means that the sample-and-hold-circuit 14 only reads out the temperature of the bridge since the pulses to its control input are high when the sweep passes the bridges. In the same manner the sample-and-hold-circuit 15 will be read out only when the product itself is scanned. Since the time constant of the sample-and-hold-circuits is relatively long, the output voltage from the sample-and-hold-circuit 14 will represent the mean value of the temperature of two bridges or alternatively of the temperature of one bridge if only the scanning of one bridge is utilized. This mean value will constitute a representative measuring value of the temperature $T_a$ of the screen device. The output voltage of the sample-and-hold-circuit 15 corresponds to the mean value of the temperature $T_o$ of the product. These two output voltages are fed thus to the differential amplifier 20, whose output voltage corresponds to a value of $T_a - T_o$. This temperature difference is used for the adjustment of the temperature of the screen device 12 by means of the temperature control system 21. In doing this the temperature $T_a - T_o$ is, thus, regulated so that it becomes closely equal to zero, that is to say that the temperature of the screen device 12 will largely correspond to the temperature of the product 2.

The comparator 24 is used for detecting material defects of the product. The comparator 24 compares the present temperature profile 32, which is supplied from the video amplifier 13 with the mean value of the immediately proceeding temperature profile of the product which is furnished by the sample-and-hold-circuit 15, a constant voltage constituting the release margin of the system being added to this immediately preceding temperature profile. This constant voltage is obtained from the voltage source 25 which in the example is assumed to consist of an adjustable resistance 26, connected to a fixed source of voltage E, so that it is possible to set the release margin as desired with the help of the adjustable resistance 26. These two voltages together form the reference level of the comparator, which is thus floating in such a manner that it follows the mean temperature $T_o$ at a distance equal to the release margin. This reference level is marked 33 in FIG. 4.

When a product defect passes the scanning line the temperature profile 32 receives a disturbance 36, which intersects the reference level and influences the comparator to activate for example a relay 28, which in turn activates an alarm circuit 29, 30 and 31. This alarm circuit in the example is symbolized by a lamp which is, thus, lit when a defect appears in the products. Naturally this alarm device can be developed further so that an automatic marking of the defective product or the part of the product which is defective takes place. It could also be imagined that the defective product would automatically be sorted out of the production line.

Figure 4:
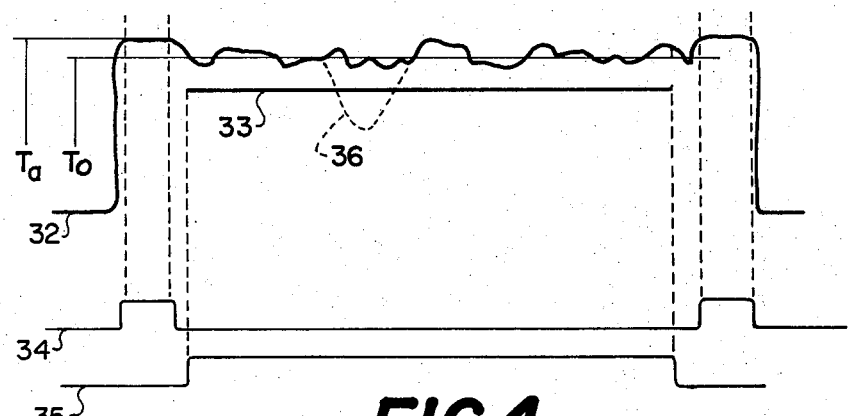
FIG. 4 is a diagram of waveforms which appear in the system.

In FIG. 4 it was assumed that the disturbance of the temperature profile is negative, that is to say the temperature of the defective spot is lower than the mean value of the temperature of the product. If the defects anticipated can only be negative it is sufficient to place a reference level below the temperature profile. On the other hand, if the defects anticipated are only positive, the reference level should then be placed above the temperature profile. Naturally a device can be used where reference levels are placed above as well as below the temperature profile.

In the embodiment described above it was assumed that the screen device only surrounds a part of the path of rays of the heat radiation closest to the product. The method of accordance with the invention can also comprise, of course, a screen device which surrounds the whole of the path of rays up to the detector.

Furthermore it was assumed that the detector is a line scanner, but, especially in the case where the screen device surrounds the whole path of rays, direct image-producing IR detector devices can be used which so scan the surfaces.

In the introduction it was mentioned that the product may, for example, be heated on one side before being moved past the detector device, the scanning taking place on the side opposite to the heating-up side. In doing this the material defects emerge because of their having a different thermal conductivity than the rest of the product which makes it possible for these material defects to be detected as spots with differing temperature on the upper side of the product — the side which is scanned.

However, the method in accordance with the invention is extremely suitable for the detection of material defects of cast or rolled products directly after the casting or rolling. What is detected then is the quicker or slower cooling down to the surrounding space of the material defect, compared with the remaining parts of the product.

Naturally, it is also possible first to cool the product and to allow it subsequently to absorb heat from the surrounding space, the absorption capacity of the material defect differing from the remainder of the product, by virtue of which such defects can be detected.

With the sensitive apparatus which is available for infrared detection, it is often sufficient to move the product from one part of a locality to another for a sufficient temperature difference to be obtained to make possible detection of material defects in the manner specified by the invention.

What is claimed:

1. A method for the detection of defects in a product giving off infrared radiation; the method including the steps of:

forming a screen device with an emission factor of approximately one;

covering a portion of the product with the screen device;

maintaining the screen device at substantially the same temperature as the portion of the product; and detecting infrared radiation coming from the portion of the product in such a way that the bulk of the radiation being detected which does not come from the portion of the product comes from the screen device; and monitoring the detected radiation to provide a defect indication.

2. The method as described in claim 1 also including the steps of:

detecting the temperature of the screen device;

comparing the temperature of the screen device with the infrared radiation coming from the portion of the product for maintaining the screen device at substantially the same temperature as the portion of the product.

3. The method as defined in claim 2 also including the steps of:

obtaining the mean value of the infrared radiation coming from the portion of the product; and comparing the infrared radiation from the portion of the product with the mean value thereof for providing the defect indication.

4. The method as defined in claim 1 in which the forming of the screen device includes forming an opening in the screen device and the infrared radiation detected comes from the portion of the product adjacent to the opening.

5. The method as defined in claim 4 in which the detecting is done so that the only infrared radiation coming from the portion detected comes obliquely from the portion through the opening.

6. The method as defined in claim 4 in which the detecting is done sequentially along a line to the opening in a slot shape along the line.

7. The method as defined in claim 6 in which the detecting is done so that the only infrared radiation coming from the portion detected comes obliguely from the portion through the opening.

8. The method as described in claim 7 also including the steps of:

detecting the temperature of the screen device;

comparing the temperature of the screen device with the infrared radiation coming from the portion of the product for maintaining the screen device at substantially the same temperature as the portion of the product.

9. The method as defined in claim 8 also including the steps of:

obtaining the mean value of the infrared radiation coming from the portion of the product;

comparing the infrared radiation from the portion of the product with the mean value thereof for providing the defect indication.

* * * * *

UNITED STATES PATENT OFFICE
CERTIFICATE OF CORRECTION

Patent No. 3,808,438  Dated April 30, 1974

Inventor(s) Sven-Bertil Borg et al.

It is certified that error appears in the above-identified patent and that said Letters Patent are hereby corrected as shown below:

Item [73] Assignee: "ASA" should read -- AGA --.

Column 6, line 26, "of" should read -- in --.

Signed and sealed this 24th day of September 1974.

(SEAL)
Attest:

McCOY M. GIBSON JR.
Attesting Officer

C. MARSHALL DANN
Commissioner of Patents